Oct. 20, 1942.   G. C. FARMER   2,299,475
AUTOMATIC TRANSMISSION CONTROL
Filed March 4, 1941
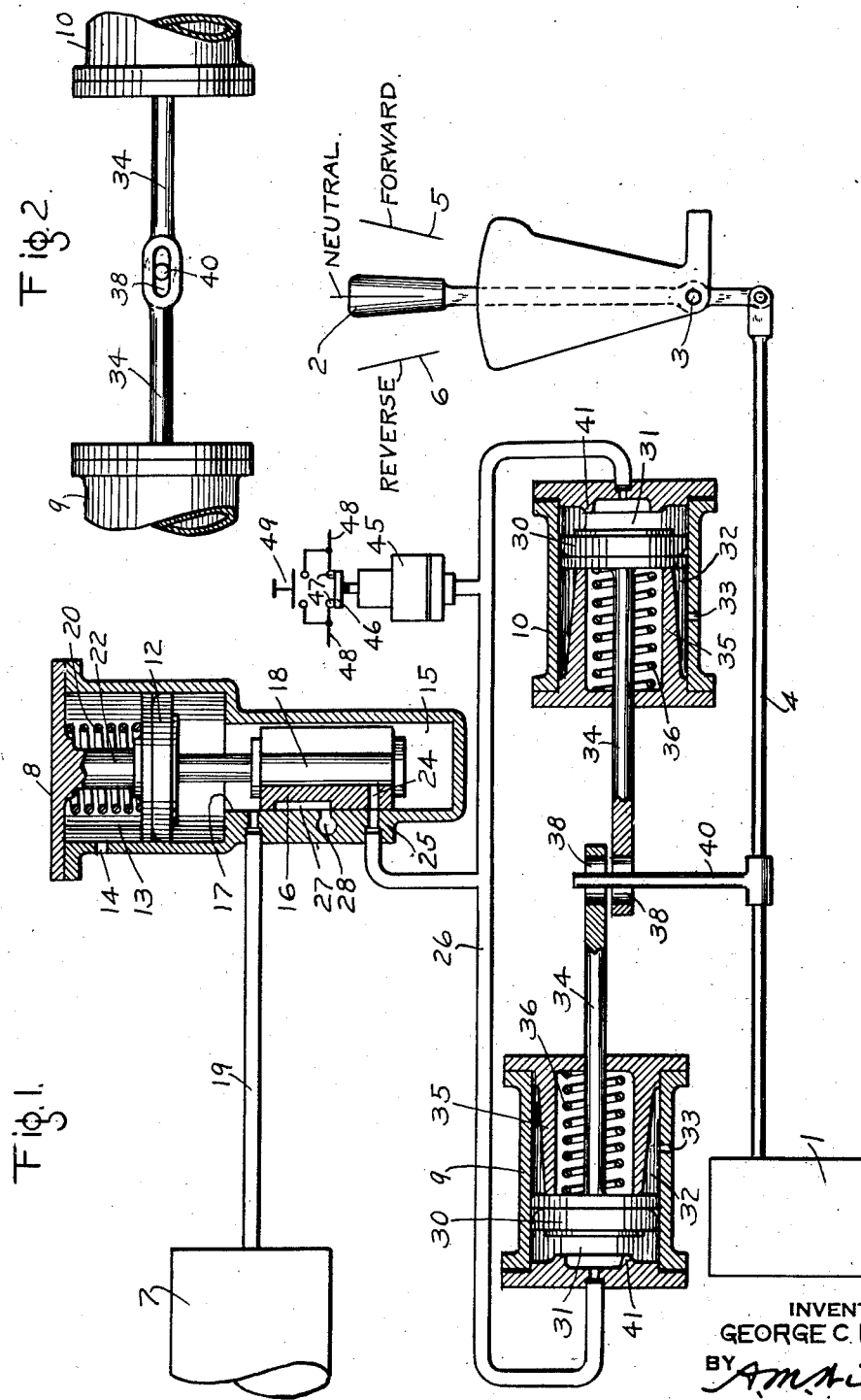
INVENTOR
GEORGE C. FARMER
BY *A. M. Higgins*
ATTORNEY Patented Oct. 20, 1942

2,299,475

UNITED STATES PATENT OFFICE 2,299,475

AUTOMATIC TRANSMISSION CONTROL

George C. Farmer, Chicago, Ill., assignor to The Westinghouse Air Brake Company, Wilmerding, Pa., a corporation of Pennsylvania Application March 4, 1941, Serial No. 381,670

12 Claims. (Cl. 192—4)

This invention relates to automatic transmission devices for motor propelled vehicles and more particularly to means for controlling the conditioning of such devices.

As is well known, certain motor driven vehicles are equipped with automatic transmission devices which operate automatically to control the speed or drive ratio between the propelling engine and the drive wheels of the vehicle. The vehicle may be started and run merely by the operator stepping on the accelerator. The vehicle may be stopped by letting up on the accelerator and applying the brakes. No manual changing of gears is required since such operations are entirely automatic. A selector lever is however provided for adjustment by the driver to select the desired direction of vehicle movement and the lever is then left in the adjusted position as long as the vehicle is being operated in the selected direction.

On certain vehicles this lever has a forward position to condition the transmission device to provide for movement of the vehicle in a forward direction. The lever also has a reverse position for conditioning the transmission device to effect movement of the vehicle in the reverse direction. The lever also has a third position, known as neutral, which is adapted to be used for neutralizing the transmission device so that the engine may be operated without power being applied to the drive wheels. When the vehicle is parked it is intended that the selector lever for the automatic transmission device be moved to the neutral position and that the brakes on the vehicle be applied.

As above mentioned, the vehicle may be started and then run and stopped with the selector lever in a drive position, for instance forward position, with no effort on the part of the driver except that required for operating the accelerator and applying the brakes when required. Accordingly it is possible for a vehicle equipped with this type of automatic type of transmission device to be parked without moving the selector lever to neutral position, i. e., it may be parked with the selector lever left for instance, in forward position.

This is undesirable since upon subsequent starting of the motor or engine and possible accelerating of same during a warming up period the vehicle might start to move forwardly, particularly in case the brakes on the vehicle are not set as hard as they should be. For instance on vehicles of the type equipped with brakes which are adapted to be applied with the pressure of fluid from a main reservoir, such pressure might while the vehicle is parked become reduced by leakage to such a degree that the vehicle might start moving upon starting the engine, as above mentioned. Such accidental starting of the vehicle may take the driver unaware and result in the vehicle colliding with another vehicle or moving out into a stream of traffic and causing not only property damage but also possible injury or death to people.

One object of the invention therefore is the provision of means which is operative automatically to neutralizing the automatic transmission device so as to prevent accidental movement of the vehicle under conditions such as above described.

Another object of the invention is the provision of means adapted to operate automatically in case the effectiveness of the brake system becomes reduced to a dangerously low degree to neutralize the automatic transmission device, so as to prevent accidental movement of the vehicle under conditions such as above described.

A more specific object of the invention is the provision of means controlled by the pressure of fluid in the brake system of the vehicle and which is adapted to operate automatically in case the pressure of such fluid becomes reduced to a chosen low degree to neutralize the automatic transmission device on the vehicle.

Other objects and advantages will be apparent from the following more detailed description of the invention.

In the accompanying drawing: Fig. 1 is a diagrammatic view, mainly in section, of an apparatus embodying one form of the invention; and Fig. 2 is a plan view of one portion of the apparatus shown in Fig. 1.

In the drawing, the reference numeral 1 indicates an automatic transmission device such as above described. The reference numeral 2 indicates a selector lever which is rockably mounted on a pin 3 and connected to the transmission device 1 through the medium of a rod 4 for controlling the conditioning of said device. The lever 2 has a neutral position, in which it is shown, for conditioning or neutralizing the transmission device 1 to prevent the transmission of power therethrough from the propelling engine (not shown) on the vehicle to the vehicle driving wheels (not shown). The selector lever 2 is adapted to be moved from the neutral position shown to a forward position indicated by the line 5 to thereby move the rod 4 in the direction of the left-hand to condition the automatic transmission device 1 for effecting forward movement of the vehicle. The selector lever is also movable to a reverse position indicated by the line 6 for moving the rod 4 in the direction of the right-hand to thereby condition the automatic transmission device 1 to effect reverse movement of the vehicle. Automatic transmission devices of the type under consideration are very complicated in structure and in view of the fact that the invention is limited to means for neutralizing same by automatically effecting movement of one of the directional control members such as a lever 2 or rod 4 to the neutral position shown, a further showing or description of the transmission device is not deemed essential to a clear understanding of the invention.

The reference numeral 7 indicates a main reservoir of a fluid pressure brake system such as employed on certain motor propelled vehicles. This reservoir is adapted to be charged with fluid under pressure by operation of an air compressor (not shown) driven, for instance, from the propulsion engine on the vehicle. The brake system may also comprise brake cylinder means (not shown) adapted to be operated by fluid under pressure from the main reservoir 7 for applying the brakes on the vehicle wheels, and a brake valve device (not shown) conditionable by the operator for controlling communication between said reservoir and brake cylinder means. When a vehicle is parked the brake valve device may be conditioned to established communication between the reservoir 7 and the brake cylinder means so that the brakes on the vehicle will be held applied by the pressure of fluid in the main reservoir while the driver is absent from the vehicle. It will thus be apparent that the pressure of fluid in the main reservoir 7 may be a measure of the degree of effectiveness of the vehicle brakes. Operation of the present invention is dependent upon the degree of brake effectiveness on the vehicle and since the pressure of fluid in reservoir 7 is a measure of such effectiveness, a showing of other parts of the brake system and a more complete description thereof would merely introduce complications which are not essential to a clear understanding of the invention and have therefore been omitted.

The present invention involves the provision of means controlled by the degree of effectiveness of the vehicle brakes, as measured by the pressure of fluid in reservoir 7, for automatically neutralizing the automatic transmission device 1 in case the effectiveness of the brakes becomes reduced to a dangerous low degree. To this end there is provided a safety device 8 controlled by the pressure of fluid in reservoir 7 and arranged to operate in case the pressure of fluid in said reservoir becomes reduced to a chosen low degree to cause operation of two pneumatic cylinder devices 9 and 10 for moving the rod 4 to a position corresponding to the neutral position of the selector lever 2, to thereby neutralize the transmission device 1.

The device 8 comprises a casing containing a piston 12 which has at one side a chamber 13 open to the atmosphere through a breather port 14 and which has at the opposite side a chamber 15. The chamber 15 contains a slide valve 16 mounted to slide on a seat 17 and connected by a stem 18 to the piston 12 for movement therewith. The valve chamber 15 is open through a pipe 19 to reservoir 7 so that the lower face of piston 12 is constantly subject to the pressure of fluid in said reservoir. In chamber 13 is a spring 20 which acts on the piston 12 in opposition to the pressure of fluid in valve chamber 15.

The pressure of spring 20 is such that when the reservoir pressure in chamber 15 exceeds a desired degree the piston 12 and side valve 16 will be moved to the positions shown against said spring, said positions being defined by engagement between the piston and a stop 22. When the pressure of fluid in the reservoir becomes reduced to below the desired degree just mentioned, spring 20 is adapted to move the piston 12 and slide valve 16 in a downwardly direction to positions defined by engagement between the end of the stem 18 and the casing. The desired pressure of fluid in reservoir 7 just mentioned is preferably of a degree which will insure a sufficient degree of brake application on the vehicle to avoid the undesirable result hereinbefore described.

In the upper position of the piston 12 and thereby of the slide valve 16, a port 24 through said valve registers with a passage 25 so as to supply fluid under pressure from the valve chamber 15 to a pipe 26. With the slide valve in its lower position above described, communication between port 24 and passage 25 is broken and said passage is connected through a cavity 27 in said slide valve to an atmospheric vent port 28 so as to thereby vent fluid under pressure from the pipe 26.

The pipe 26 leads to the two cylinder devices 9 and 10 which, as will be apparent, are connected in parallel and therefore adapted to operate in unison.

Both of the devices 9 and 10 are identical in structure each comprising a casing containing a piston 30 having at one side a chamber 31 connected to pipe 26 and having at the opposite side a chamber 32 which is open to the atmosphere through a breather port 33. The two pistons 30 are arranged opposite to each other and each is provided with a piston rod 34 extending in the direction of the opposite piston. Each of the devices 9 and 10 has a piston stop 35 projecting into chamber 32 for engagement by the piston 30 to define a normal position thereof in which it is shown. Encircling the piston rod 34 within each of the stops 35 is a spring 36 acting on the piston for urging same in a direction away from the stop 35.

The two piston rods 34 are disposed at one side of the selector rod 4 and extend parallel thereto. The ends of the two rods 34 overlap each other and in the end of each there is provided an elongated opening 38, the two openings 38 lining up with each other when the two pistons 30 are in contact with their respective stops 35.

A shifting bar 40 is rigidly secured to the selector rod 4 for movement therewith, and extends through the openings 38 in the ends of the two piston rods 34. The openings 38 are of such length as to provide for free movement of the bar 40 therein without contacting the piston rods 34 upon movement of the selector rod 4 by the selector lever 2, when the pistons 30 are in the positions shown engaging the stops 35. The pistons 30 are adapted to be moved from the positions shown by springs 36 into contact with annular stops 41 provided at the outer ends of the cylinder devices, in which position the outer ends of slots 38, that is, the ends adjacent the ends of the piston rods, are adapted to substantially engage the opposite sides of the bar 40.

In operation, when the pressure of fluid in reservoir 7 is adequate to provide a safe degree of braking on the vehicle the parts of the device 8 will occupy their upper positions shown so as to supply fluid under pressure from said reservoir through pipe 26 to piston chambers 31. The pistons 30 will therefore be held against stops 35 and the openings 38 in the ends of the two piston rods 34 will be aligned so as to permit free movement of the bar 40 with the rod 4 and relative to the piston rods 34. Under this condition the automatic transmission device 1 is adapted to be adjusted in the usual manner by manual movement of the selector lever 2 to its different positions above described.

If at any time the pressure of fluid in reservoir 7 becomes reduced, due to leakage or for any other reason, to a degree which will not insure safe braking of the vehicle the spring 29 in device 8 will move the piston 12 and thereby the slide valve 16 to its lower position for venting fluid under pressure from the piston chambers 31. When this occurs the springs 36 in the two cylinder devices 9 and 10 will move the pistons 30 away from the stops 35 and into contact with the stops 41. This operation of the pistons 30 will move the piston rods 34 in a direction away from each other and therefore the opposite, outer ends of the openings 38 are moved toward the bar 40.

If at the time the cylinder devices 9 and 10 operate, as just described the selector lever 2 and rod 4 are in their forward position the end of the slot 38 in the piston rod 34 of the cylinder device 10 will contact the bar 40 and through same move the rod 4 and lever 2 to their neutral positions shown. In case the selector lever 2 is in reverse position at this time the neutralizing thereof and thereby of the rod 4 will be effected by piston rod 34 of the cylinder device 9. Thus, regardless of the position of the selector lever 2 and rod 4, if the pressure of fluid in reservoir 7 becomes reduced to less than a chosen degree, either the cylinder device 9 or 10 acting through the bar 40 will automatically return said rod and lever to their neutral positions in which they will be resiliently held by the opposing action of the two springs 36.

It will now be apparent that in case the pressure of fluid in reservoir 7 becomes so reduced as not to provide safe braking of the vehicle the automatic transmission device 1 will automatically be neutralized by operation of the device 8 and of the cylinder devices 9 and 10. Thus accidental movement of the vehicle and the possibility of damage such as hereinbefore described will be avoided.

When the pressure of fluid in the reservoir 7 is subsequently restored to a degree which will insure safe braking of the vehicle, the consequent increase in pressure in valve chamber 15 on piston 12 of the valve device 8 will return said piston to its upper position into contact with stop 22. The slide valve 16 will as a consequence be returned to its normal position shown for again supplying fluid under pressure from the valve chamber 15 to pipe 26 and thence to piston chambers 31 for moving the pistons 30 into contact with the stops 35. With the pistons 30 thus returned to their normal positions, the slots 38 in the ends of the rods 34 will be again aligned with each other so as to free the bar 40 for movement with the selector rod 4. The selector lever 2 may then again be operated manually in the usual manner to condition the automatic transmission device 1, as desired.

While the springs 36 will act to operate the rod 4 to neutralize the automatic transmission device 1 under the condition above described, their force is also sufficiently small to permit the selector lever 2 to be manually moved to either the forward or reverse position. This is desirable in order to condition the automatic transmission device 1 to provide a drive connection between the engine and the vehicle wheels, for emergency movement of the vehicle to a repair terminal or the like. The selector lever 2 will of course under this condition have to be held in the selected position against one or the other springs 36.

In addition to neutralizing the automatic transmission device 1 in case the braking pressure in reservoir 7 falls to a dangerously low degree, a switch device 45 controlled by the pressure of fluid in pipe 26 is provided for at the same time opening the ignition circuit of the engine of the vehicle so that the engine cannot be started without the operator having to effect some unusual, manual operation which will automatically bring the dangerous situation to his attention.

The switch device 45 comprises a movable contact 46 which is adapted to be moved by fluid pressure in pipe 26 into engagement with two fixed contacts 47 which are connected to wires 48 through which the engine ignition circuit is normally closed. Thus when the pressure of fluid in the reservoir 7 is of a safe degree and pipe 26 is charged therefrom the switch device 45 will effect closure of the ignition circuit at this point and provide for usual operation of the engine. However, in case the pressure of fluid in the reservoir 7 becomes reduced to a dangerously low degree and the pipe 26 is as a consequence vented through the valve device 8, such venting of fluid under pressure from the switch device 45 is adapted to provide for movement of the contact 46 out of engagement with the fixed contacts 47. The ignition circuit of the engine will thus be automatically opened so that the operator cannot start the engine without being aware that the braking on the vehicle is in a dangerous condition.

In order to start the engine under this condition a manually closed self-opening switch 49 is provided shunting the switch device 45. By closing the switch device 49 the engine may be started to replenish the pressure of fluid in the reservoir 7. When the reservoir pressure is then increased to the setting of device 8, said device will operate to supply fluid under pressure to pipe 26 to operate the switch device 45 to close the ignition circuit at which time the shunt switch 49 may be released. In case however the brake failure on the vehicle is such as to prevent restoring the pressure in the reservoir 7 to the desired safe degree the vehicle may be moved to a repair terminal or the like by holding the shunt switch 49 closed at the same time as the selector lever 2 is manually held in a drive position against the action of spring 36 in one of the cylinder devices 9 and 10.

*Summary*

It will now be apparent that unwanted movement of the vehicle and the possibility of accidents occurring, such as hereinbefore described, will be prevented by automatic operation of the improved mechanism to neutralize the automatic transmission device 1 in case the pressure of fluid in reservoir 7 becomes so reduced as to prevent braking of the vehicle to a safe degree.

And it will be further noted that the switch device 45 will operate under this abnormal condition as an indicator to the operator of such condition so that the vehicle cannot be started with the operator being unaware of the situation. The apparatus is so designed however that the vehicle may be moved out of traffic or to a shop for repair by means which require certain maintained manual effort during such movement, whereby the operator will be constantly aware of the condition and thereby exercise a maximum degree of caution.

While only one illustrated embodiment of the invention has been described in detail, it is not the intention to limit the scope to that embodiment or otherwise than by the terms of the appended claims.

Having now described my invention, what I claim as new and desire to secure by Letters Patent, is:

1. The combination with an automatic power transmission device operative to transmit power from a propulsion motor to the wheels of a vehicle and selector means normally adjustable manually to different drive positions to condition said device to provide different drive connections between said motor and wheels and to a neutral position for neutralizing said transmission device so as to disconnect said motor from said wheels, of means providing a measure of the degree of braking available on said vehicle, and means conditionable by the last named means to provide for normal manual adjustment of said selector means when the available degree of said braking equals or exceeds a chosen degree and operative automatically upon a reduction in the available degree of said braking below said chosen degree to effect operation of said selector means to neutralize said transmission device.

2. The combination with an automatic power transmission device operative to transmit power from a propulsion motor to the wheels of a vehicle and selector means normally adjustable manually to different drive positions to condition said device to provide different drive connections between said motor and wheels and to a neutral position for neutralizing said transmission device so as to disconnect said motor from said wheels, said vehicle having a brake system including a reservoir from which fluid under pressure is adapted to be drawn to apply the brakes on said vehicle, of means conditionable by the pressure of fluid in said reservoir to provide for normal manual adjustment of said selector means when the pressure in said reservoir equals or exceeds a chosen degree and operative automatically upon a reduction in pressure in said reservoir to below said chosen degree to neutralize said transmission device.

3. The combination with an automatic power transmission device operative to transmit power from a propulsion motor to the wheels of a vehicle and selector means normally adjustable manually to different drive positions to condition said device to provide different drive connections between said motor and wheels and to a neutral position for neutralizing said transmission device so as to disconnect said motor from said wheels, said vehicle having a brake system including a reservoir from which fluid under pressure is adapted to be drawn to apply the brakes on said vehicle, spring means operative to adjust said selector means to said neutral position, movable abutment means operative by fluid under pressure to condition said spring means to provide for normal manual adjustment of said selector means and operative upon the release of fluid under pressure to render said spring means operative, and means controlled by the pressure of fluid in said reservoir and operative thereby when said pressure exceeds a chosen degree to supply fluid under pressure to actuate said movable abutment means and upon a reduction in said reservoir pressure to a degree less than said chosen degree to release fluid under pressure from said abutment means.

4. The combination with an automatic power transmission device operative to transmit power from a propulsion motor to the wheels of a vehicle and selector means normally adjustable manually to different drive positions to condition said device to provide different drive connections between said motor and wheels and to a neutral position for neutralizing said transmission device so as to disconnect said motor from said wheels, said vehicle having a brake system including a reservoir from which fluid under pressure is adapted to be drawn to apply the brakes on said vehicle, of automatic means conditionable by fluid under pressure supplied to a chamber to provide for normal manual adjustment of said selector means, spring means operative upon release of fluid under pressure from said chamber to actuate said automatic means to adjust said selector means to said neutral position, means controlled by the pressure of fluid in said reservoir and operative when the reservoir pressure equals or exceeds a chosen degree to supply fluid under pressure to said chamber and when less than said chosen degree to release fluid under pressure from said chamber.

5. The combination with an automatic power transmission device operative to transmit power from a propulsion motor to the wheels of a vehicle and selector means normally adjustably manually to different drive positions to condition said device to provide different drive connections between said motor and wheels and to a neutral position for neutralizing said transmission device so as to disconnect said motor from said wheels, said vehicle having a brake system including a reservoir from which fluid under pressure is adapted to be drawn to apply the brakes on said vehicle, of automatic means conditionable by fluid under pressure supplied to a chamber to provide for normal manual adjustment of said selector means, spring means operative upon release of fluid under pressure from said chamber to actuate said automatic means to adjust said selector means to said neutral position, means controlled by the pressure of fluid in said reservoir and operative when the reservoir pressure equals or exceeds a chosen degree to supply fluid under pressure to said chamber and when less than said chosen degree to release fluid under pressure from said chamber, said selector means being adjustable manually to its different drive positions against the force of said spring means.

6. The combination with an automatic power transmission device for transmitting power from the propulsion motor to the wheels of a vehicle and selector means normally adjustable manually to different drive positions to condition said device to provide different drive connections between said motor and wheels and to a neutral position for neutralizing said transmission device to disconnect said motor from said wheels; of spring means operative to adjust said selector means to said neutral position, means operative upon a supply of fluid under pressure to a chamber to condition said spring means to provide for normal manual adjustment of said selector means and upon the release of fluid under pressure from said chamber to render said spring means operative, and means conditionable automatically in accordance with an operating condition of the vehicle for supplying fluid under pressure to said chamber when the operating condition is normal and to release fluid under pressure from said chamber upon a change in said operating condition from normal.

7. The combination with an automatic power transmission device for transmitting power from the propulsion motor to the wheels of a vehicle and selector means normally adjustable manually to different drive positions to condition said device to provide different drive connections between said motor and wheels and to a neutral position for neutralizing said transmission device to disconnect said motor from said wheels; of movable abutment means normally disconnected from said selector means to provide for manual adjustment of said selector means and adapted to be connected to said selector means to adjust same to said neutral position, and means controlled by an operating condition of the vehicle controlling said movable abutment means and operative to disconnect same from said selector means when said operating condition is normal and operative upon a change in said operating condition from normal to connect said movable abutment means to said selector means.

8. The combination with an automatic power transmission device for transmitting power from the propulsion motor to the wheels of a vehicle and selector means normally adjustable manually to different drive positions to condition said device to provide different drive connections between said motor and wheels and to a neutral position for neutralizing said transmission device to disconnect said motor from said wheels; of movable abutment means connected with said selector means and normally conditionable to provide for manual adjustment of said selector means and adapted to operate automatically to adjust said selector means to said neutral position, and means controlled by the effectiveness of the brakes on the vehicle controlling said movable abutment means and operative to condition same when said effectiveness equals or exceeds a chosen degree to provide for normal manual adjustment of said selector means and upon a reduction in said effectiveness to less than said chosen degree to render said movable abutment means operable.

9. The combination with an automatic power transmission device for transmitting power from the propulsion motor to the wheels of a vehicle and selector means normally adjustable manually to different drive positions to condition said device to provide different drive connections between said motor and wheels and to a neutral position for neutralizing said transmission device to disconnect said motor from said wheels; of movable abutment means conditionable in accordance with either the supply of fluid under pressure to a chamber or the release of fluid under pressure therefrom to either provide for normal manual adjustment of said selector means or for automatically adjusting said selector means to said neutral position, and means controlled by an operating condition of the vehicle and adjustable to one position when said operating condition is normal and to another position upon a change in said condition from normal, the last named means in one of its positions being operative to supply fluid under pressure to said chamber and in the other to vent fluid under pressure from said chamber.

10. The combination with an automatic transmission device for transmitting power from the propulsion motor to the wheels of a vehicle and selector means adjustable manually to different drive positions to condition said device to provide different drive connections between said motor and wheels and to a neutral position to disconnect said motor from said wheel, of a cylinder device, a piston in said cylinder device having at one side a pressure chamber, a rod carried by said piston and connected to said selector means, spring means operative upon release of fluid under pressure from said chamber to actuate said rod to move said selector means to said neutral position, said piston being operative upon supply of fluid under pressure to said chamber to condition said rod to provide for normal manual adjustment of said selector means, and means controlled by an operating condition of the vehicle controlling the fluid pressure in said chamber and operative automatically when said condition is normal to supply fluid under pressure to said chamber and upon a change in said condition from normal to release fluid under pressure therefrom.

11. The combination with an automatic transmission device for transmitting power from the propulsion motor to the wheels of a vehicle and selector means adjustable manually to different drive positions to condition said device to provide different drive connections between said motor and wheels and to a neutral position to disconnect said motor from said wheels, said selector means including a shifter member having positions corresponding to those of said selector means with the neutral position arranged between the drive positions, of a pair of oppositely arranged cylinder devices each having a piston and a rod projecting therefrom, each of said pistons having at one side a chamber adapted to be either supplied with fluid under pressure or vented, each of said pistons being movable to a normal position upon the supply of fluid under pressure to the said chamber therein, spring means for moving said pistons to a neutralizing position upon the release of fluid under pressure from said chambers, said rods being connected with said shifter member and so designed and arranged as to provide for normal manual shifting of said selector means when said chambers are supplied with fluid under pressure and being operative upon release of fluid under pressure from said chambers to move said shifter member to said neutral position, and automatically operating means controlled by an operating condition of the vehicle and operative when said condition is normal to supply fluid under pressure to said chambers and upon a change from normal to release fluid under pressure from said chambers.

12. The combination with an automatic transmission device for transmitting power from an internal combustion engine having an ignition circuit to the wheels of a vehicle and selector means adjustable manually to different drive positions to condition said device to provide different drive connections between said engine and wheels and to a neutral position to disconnect said engine from said wheels, of resilient means operative to move said selector means to and to resiliently hold same in said neutral position, a switch device controlling said circuit, means controlled by an operating condition of the vehicle controlling said resilient means and switch device and operative when said operating condition is normal to condition said resilient means to provide for manual adjustment of said selector means and to condition said switch device to close said circuit and operative automatically upon a change in said operating condition from normal to effect operation of said resilient means to move said selector means to neutral position and to effect operation of said switch device to open said circuit, said selector means being movable manually against said resilient means from said normal position to a drive position, and a manually closable self-opening switch arranged to control said circuit independently of said switch device.

GEORGE C. FARMER.